United States Patent
Kim (10) Patent No.: US 6,680,844 B2
(45) Date of Patent: Jan. 20, 2004

(54) LIGHTWEIGHT, ENERGY-EFFICIENT, DETACHABLE COMPUTER LIGHT

(75) Inventor: Darren C. Kim, Oakland, CA (US)

(73) Assignee: nexform, Inc., Oakland, CA (US)

( * ) Notice: Subject to any disclaimer, the term of this patent is extended or adjusted under 35 U.S.C. 154(b) by 100 days.

(21) Appl. No.: 09/847,195

(22) Filed: May 1, 2001

(65) Prior Publication Data

US 2001/0048409 A1 Dec. 6, 2001

Related U.S. Application Data (60) Provisional application No. 60/207,446, filed on May 30, 2000.

(51) Int. Cl.[7] .............................. H05K 5/02; H05K 7/10; F21L 4/04
(52) U.S. Cl. ...................... 361/683; 361/686; 362/198
(58) Field of Search .................. 361/683–686; 362/85, 109, 1, 198, 199, 253; 349/61–63

(56) References Cited

U.S. PATENT DOCUMENTS

| | | | | | |
|---|---|---|---|---|---|
| 1,651,307 | A | * | 11/1927 | Wilkinson | 362/195 |
| 3,666,938 | A | * | 5/1972 | Dolega | 362/398 |
| 4,949,230 | A | * | 8/1990 | Burmeister | 362/109 |
| 5,008,793 | A | * | 4/1991 | Copeland | 362/413 |
| 5,122,937 | A | * | 6/1992 | Stoudemire | 362/109 |
| 5,130,907 | A | * | 7/1992 | Tortola et al. | 273/148 B |
| 5,172,974 | A | * | 12/1992 | Riban | 362/109 |
| 5,183,325 | A | * | 2/1993 | Hurdle | 362/109 |
| 5,369,560 | A | * | 11/1994 | Friedman | 362/190 |
| 5,379,201 | A | * | 1/1995 | Friedman | 362/191 |
| 5,486,986 | A | * | 1/1996 | Brada | 362/109 |
| 5,615,945 | A | | 4/1997 | Tseng | |
| 5,767,844 | A | * | 6/1998 | Stoye | 345/168 |
| 5,815,225 | A | * | 9/1998 | Nelson | 349/1 |
| 5,835,388 | A | * | 11/1998 | Helm | 359/148 |
| 5,868,487 | A | * | 2/1999 | Polley et al. | 362/109 |
| 6,145,992 | A | * | 11/2000 | Wattenburg | 362/23 |
| D435,679 | S | * | 12/2000 | Naghi et al. | D26/103 |
| 6,161,944 | A | * | 12/2000 | Leman | 345/168 |
| 6,186,636 | B1 | | 2/2001 | Naghi et al. | |
| 6,260,984 | B1 | | 7/2001 | Naghi et al. | |
| 6,336,727 | B1 | * | 1/2002 | Kim | 345/161 |
| 6,371,622 | B1 | * | 4/2002 | Moon | 349/61 |
| 6,386,724 | B2 | * | 5/2002 | Naghi | 362/85 |
| 6,406,161 | B1 | * | 6/2002 | Lin et al. | 362/250 |
| 6,409,532 | B2 | * | 6/2002 | Payson et al. | 439/320 |
| 2001/0043468 | A1 | * | 11/2001 | Krietzman et al. | 362/85 |
| 2002/0131269 | A1 | * | 9/2002 | Bird et al. | 362/198 |

FOREIGN PATENT DOCUMENTS

| | | | | |
|---|---|---|---|---|
| DE | 20100642 U1 | * | 3/2001 | F21S/6/00 |
| FR | 2754588 A3 | * | 4/1998 | F21V/33/00 |
| GB | 2361298 A | * | 10/2001 | B41J/29/02 |
| GB | 2367884 A | * | 4/2002 | F21V/33/00 |

* cited by examiner

*Primary Examiner*—Anatoly Vortman
(74) *Attorney, Agent, or Firm*—Frederick D. Kim (57) ABSTRACT

A computer light for illuminating the computer keyboard or other items in low light environments includes a super bright white LED and a USB plug that enables it to be powered from USB connection ports. The computer light has an elongated neck that is flexible enough to allow the light head to be positioned with ease but stiff enough to allow the light head to assume a fixed position relative to the computer keyboard or other items when it is not being manipulated. The computer light is especially useful for users of portable computers because it is lightweight and energy-efficient, and may be stored in a compact manner.

10 Claims, 7 Drawing Sheets

FIGURE 6B

Fore ← → Aft

Fore ←——→ Aft

LIGHTWEIGHT, ENERGY-EFFICIENT, DETACHABLE COMPUTER LIGHT

RELATED APPLICATION

This application claims the benefit of Provisional Patent Application No. 60/207,446, filed May 30, 2000. The entire contents of this provisional patent application are incorporated by reference herein.

BACKGROUND OF THE INVENTION

1. Field of the Invention

The invention relates generally to a computer light, and more particularly to a portable energy-efficient light that is compatible with a computer port such as the Universal Serial Bus (USB) port or the IEEE1394 (firewire) port.

2. Description of the Related Art

As computer use has increased over the years, computer use in low light environments has increased as well. In low light environments, the user is able to view the screen but oftentimes is unable to see the computer keyboard or view paper notes such as presentation notes or slides. This is inconvenient even for skilled typists because some keys (e.g., arrow, function, and delete keys) are located on the outer edges of the keyboard and thus are hard to locate by feel. At times, the user needs to look at the keyboard and locate the desired key before pressing it, but when there is little or no light for illuminating the keyboard, the user often resorts to guessing and presses the wrong key. In addition oftentimes, when a user needs to remove or insert cables into the computer, there is little light in the back of the computer appliance.

Many portable light devices are available for the computer user, but these devices require their own power source and are convenient only for use in conjunction with desktop computers. These devices are simply too bulky to be carried around and used in conjunction with laptop computers. The weight that the portable light device and its power source adds to the weight of the laptop computer and the laptop computer's power source is also a limiting factor. For these and other reasons, portable light devices, although useful, have not yet become popular with laptop computer users and handy for desktop computer users.

SUMMARY OF THE INVENTION

The invention provides a computer light that illuminates the computer keyboard or other items, such as a document that the computer user is working on, in low light environments. The computer light is lightweight and has a plug that is connectable to a computer port to draw power from the computer's power source. As a result, users of laptop computers may pack and carry around this device with their laptop computers without adding too much extra weight. The computer light is also energy-efficient so that it does not cause an unnecessary power drain on the power supply of the laptop computer. Furthermore, the computer light has an elongated neck that is flexible enough to allow the light head to be positioned with ease but stiff enough to allow the light head to assume a fixed position relative to the computer keyboard or other items when it is not being manipulated.

The accompanying drawings, which are incorporated in and constitutes a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The preferred embodiment described below relates to a computer light that is configured to be used with a USB port on a computer, but the invention need not be limited thereto. For example, it is contemplated that a computer light embodying the features of the invention may be configured for use with other computer ports, including but not limited to, the IEEE1394 (firewire) port.

Figure 1:
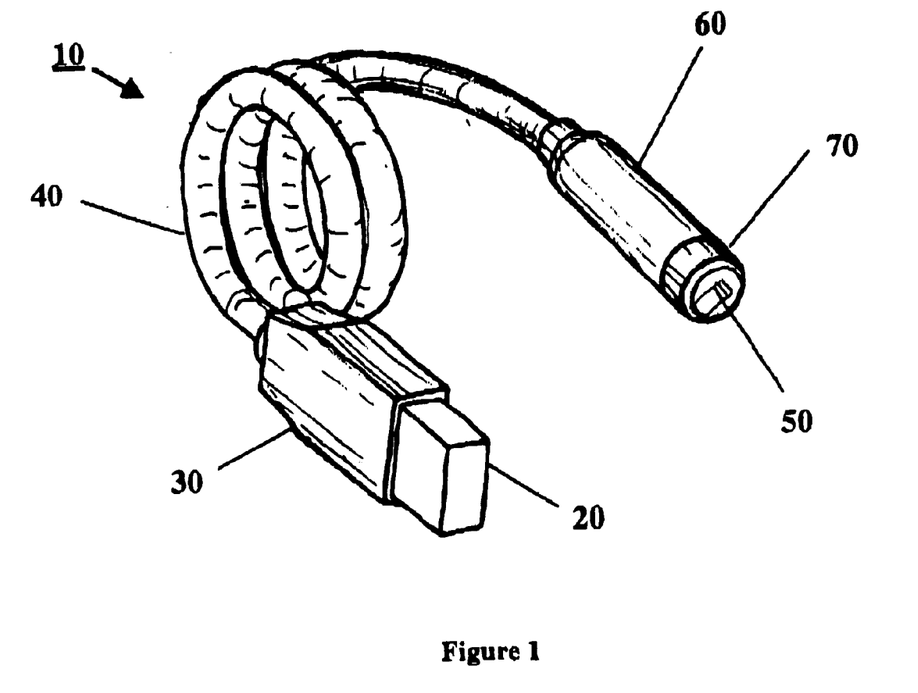
FIG. 1 illustrates a computer light according to an embodiment of the invention.

FIG. 1 illustrates a computer light according to an embodiment of the invention. The computer light or lamp 10 has a USB plug 20 to be connected to power and ground leads of a USB connector on a computer (see FIGS. 2 and 4) or a computer keyboard (see FIG. 3).

Functionally, the computer light 10 is a USB-slave device. A USB slave device is peripheral device that is controlled by any USB master device using a communication protocol known as the USB protocol. Other examples of a USB slave device include scanners, microphones, speakers, and game control devices. USB ports have become increasingly popular in recent years because of its high data rates, industry standard support and compact port design.

An over-molded plastic jacket 30 is formed partially over the USB plug 20. The plastic jacket 30 serves as a handle used during the insertion of the USB plug 20 into a corresponding USB connection port on a computer and a stop limit to prevent the USB plug 20 from being inserted too far into the corresponding USB connection port.

Figure 5A:
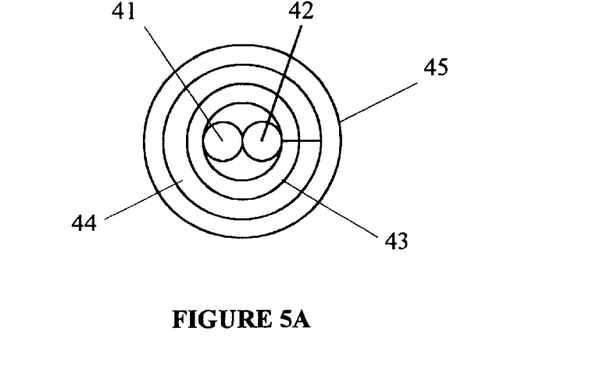
FIG. 5A is a cross-sectional view of a gooseneck cable of the computer light.

The computer light further includes a gooseneck cable 40 and a light emitting diode (LED) 50. As shown in FIG. 5A, the gooseneck cable 40 has a pair of insulated copper wires 41, 42 extending along its center portion to electrically couple the USB plug 20 to the LED 50. The gooseneck cable 40 is flexible enough to allow manual positioning of the LED 50 but stiff enough to allow the LED 50 to assume a fixed position relative to the computer keyboard or other items when it is not being manipulated. Also, when the computer light is not in use, the gooseneck cable 40 permits it to be coiled into a compact position.

Figure 5B:
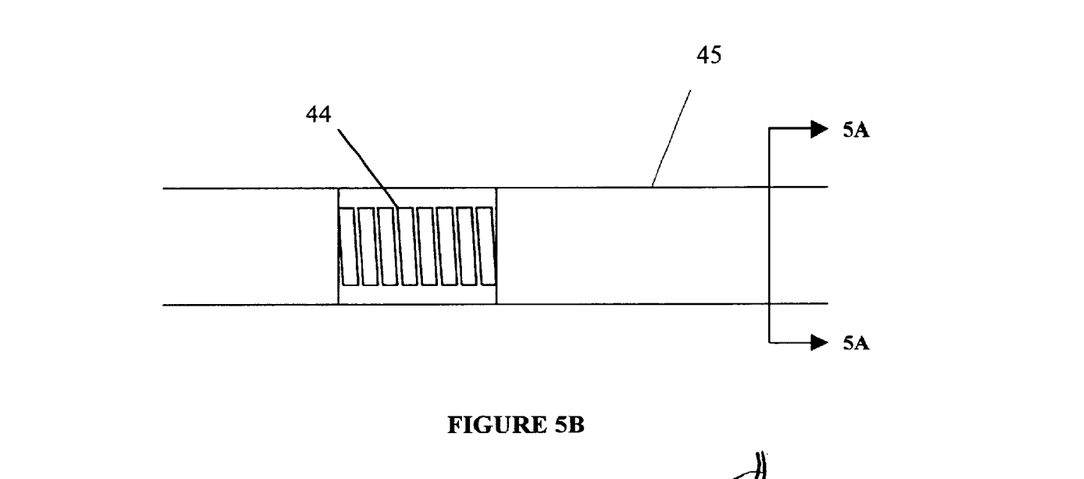
FIG. 5B is a plan view of the gooseneck cable having a cut-away portion.
Figure 5C:
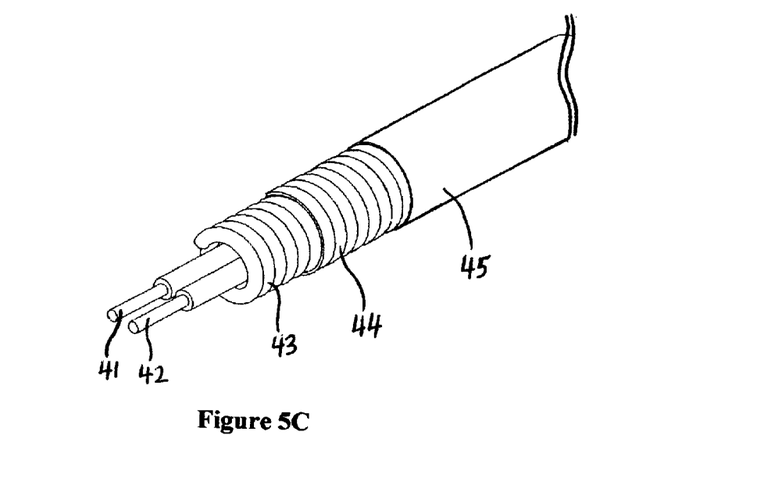
FIG. 5C is a perspective view of a cut-away section of the gooseneck cable.

The rigidity or stiffness in the gooseneck cable 40 is introduced by a pair of tubings 43, 44, the cross-sections of which are shown in FIG. 5A. A plastic cover 45 is provided for decorative purposes. Each of the tubings 43, 44 is made of metal wire and is formed by winding the metal wire into a tight spiral as shown in the cut-away view in FIGS. 5B and 5C. The outer radius of the spirals of the inner tubing 43 is formed to be substantially equal to the inner radius of the spirals of the outer tubing 44. The static friction force between the inner and outer tubings 43, 44 tends to keep the gooseneck cable 40 in a fixed position when no forces are being applied.

In the preferred embodiment, the winding direction of the spirals of the inner tubing 43 is the same as the winding direction of the spirals of the outer tubing 44. In alternative embodiments, the winding directions may be different. Further, the invention is not limited to any one way of introducing rigidity or stiffness to the gooseneck cable 40. Alternative ways are known to those of ordinary skill in the art and the invention is intended to cover all such variations.

The length of the gooseneck cable 40 is preferably about 16–18 inches. Other lengths of the gooseneck cable 40 may be used in accordance with the invention, but based on predictable uses of the computer light, especially with laptop computers, it was determined that the length of 16–18 inches would be convenient to the user. This length makes the computer light 10 easy to handle and allows the LED 50 to be positioned over the top, side, next to the base unit, etc.

The LED 50 produces a super bright white light and is positioned with the gooseneck cable 40 to provide illumination for the computer keyboard, display, side, etc. When the computer light 10 is inserted into the USB connection port on the host computer or host keyboard, power from the computer's power supply is supplied to the LED 50 by way of the USB plug 20 and the wires in the gooseneck cable.

In the exemplary embodiment, the LED 50 requires 3.6–4.0 volts and draws approximately 0.020–0.030 milli-amperes. As such, the LED 50 consumes around 0.1 watts when connected to the computer's power supply. Since the computer provides a 5-volt source, the voltage is stepped down to 3.6 volts before being supplied to the LED 50. Even when it is used constantly and remains ON, the LED 50 decreases the battery life of a laptop computer by only 1 to 3%. One example of an LED that has the above characteristics is an LED manufactured by Nichia. Another advantage of the LED is its very high life expectation. As a result, unlike light bulbs, which need to be replaced fairly often, with an LED, there is little or no need for replacement.

Because the LED 50 draws its power from the computer through the USB connection port, the computer light 10 does not need a battery pack as a power source. Consequently, the lamp design is greatly simplified, has less parts and minimizes weight. In the exemplary embodiment, the total weight of the computer light 10 is less than 3 ounces. In addition, the computer light 10 is very durable and shock-proof. Unlike lamps that use light bulbs, there are no parts that can break easily.

As further illustrated in FIG. 1, the LED 50 is encased by aluminum cylindrical housing 60 and a plastic clear lens 70. One end of the cylindrical housing 60 is fitted over the gooseneck cable 40 so that the cylindrical housing surrounds the LED 50 and the lens 70 is press fitted to the other end of the cylindrical housing 60 to encapsulate the LED 50 inside the cylindrical housing 60.

Figure 6A:
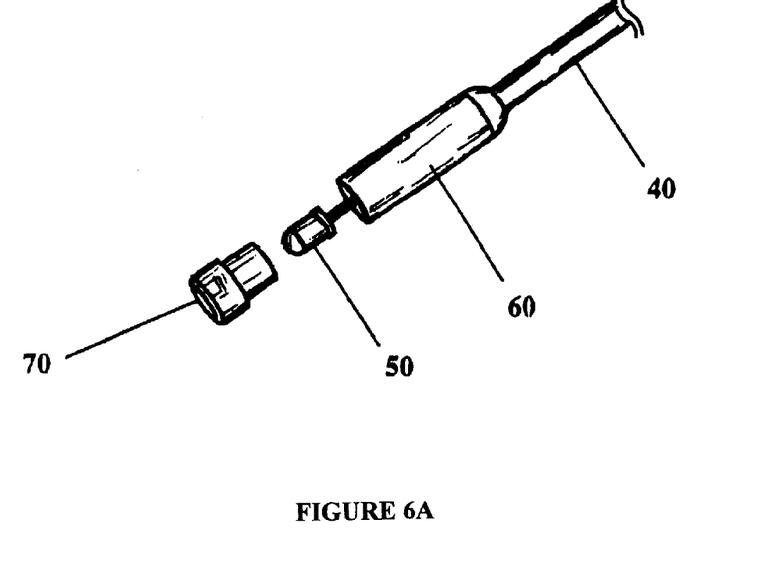
FIG. 6A is an exploded perspective view of the LED head assembly.
Figure 6B:
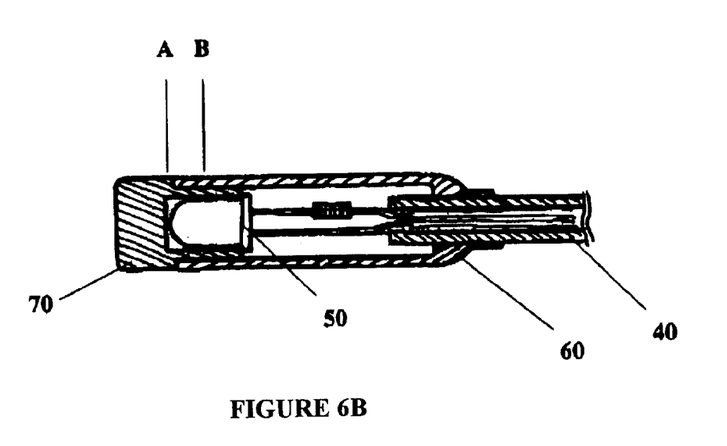
FIG. 6B is a cross-sectional view of the LED head assembly.

The details of the LED head assembly is illustrated in FIGS. 6A and 6B. FIG. 6A is an exploded perspective view and FIG. 6B is a cross-sectional view in the assembled state. Line A in FIG. 6B represents the fore-aft position of the rear plane of the lens 70 and Line B in FIG. 6B represents the fore-aft position of the light point source of the LED. In the preferred embodiment, Line B is behind Line A, as shown in FIG. 6B. The position of the LED in the preferred embodiment provide useful light without producing the harsh glare that can be distracting to the user.

The plastic clear lens 70 alters light beam characteristics of light emitted by the LED 50, e.g., color, amount of dispersal, etc. The surface finish of the lens 70 can be changed to provide different light quality as well as provide a soft glow that can be very pleasing to the user.

Alternatively, the plastic clear lens 70 may include a silvered reflector that is positioned in front of the LED 50. The light from the LED 50 spans a small cone angle and the silvered reflector reflects the light into desirable position, spread, characteristic or intensity.

In addition, the plastic clear lens 70 may include physical or digital 'mask' to alter the light beam to convey information to the user such as temperature reading, time, etc. For example, a lensing element plus a miniature liquid crystal display can be used together to produce a light beam that when reflected against a wall can provide a clock feature to the user. Also, a multicolor LED can be used to convey information to the user through the change in the color.

Figures 2, 3, 4:
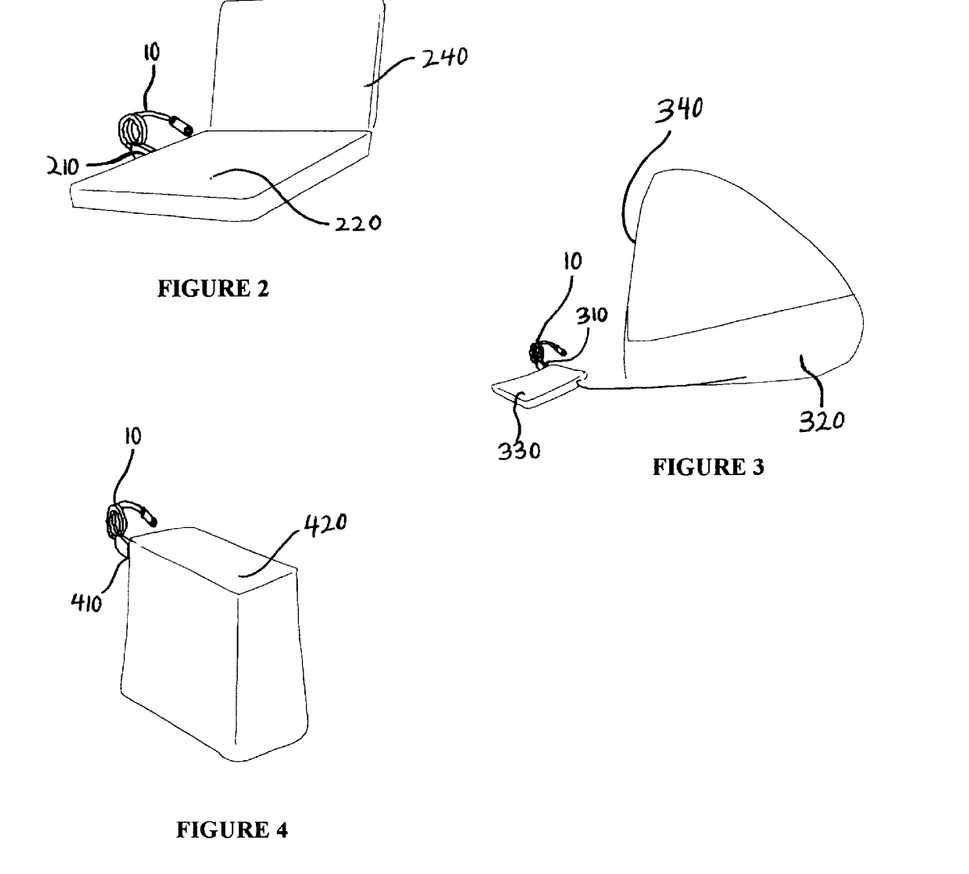
FIG. 2 illustrates the computer light connected to a port provided on a laptop computer.
FIG. 3 illustrates the computer light connected to a port provided on a computer keyboard.
FIG. 4 illustrates the computer light connected to a port provided on a main console of a desktop computer.

FIG. 2 illustrates the computer light 10 connected to a USB connection port 210 provided on a main console 220 of a laptop computer. A keyboard (not shown) of the laptop computer is formed integrally on the upper surface of the main console 220 of the laptop computer, and a display 240 is attached in a hinged manner to the main console 220 of the laptop computer.

FIG. 3 illustrates the computer light 10 connected to a USB connection port 310 provided on a keyboard 330 of a desktop computer. The keyboard 330 is electrically connected to a main console 320 of the desktop computer through an electrical cord and plug but is physically separate from the main console 320. A display 340 of the desktop computer is, however, is formed integrally on the front face of the desktop computer. In this embodiment, power is supplied from the power supply housed in the main console to the LED 50 through the keyboard 330.

FIG. 4 illustrates the computer light 10 connected to a USB connection port 410 provided on a main console 420 of a desktop computer. In this embodiment, both the computer keyboard 430 and the computer display 440 are physically separate from the main console 420 and electrically connected to the main console 420 through their respective electrical cords and plugs.

In the three embodiments shown in FIGS. 2–4, the main console includes a processor, associated memory, and a power source. The power source is typically a DC power source and is configured to supply power to externally connected devices through connection ports, e.g., to USB slave devices through USB connection ports.

Figure 7:
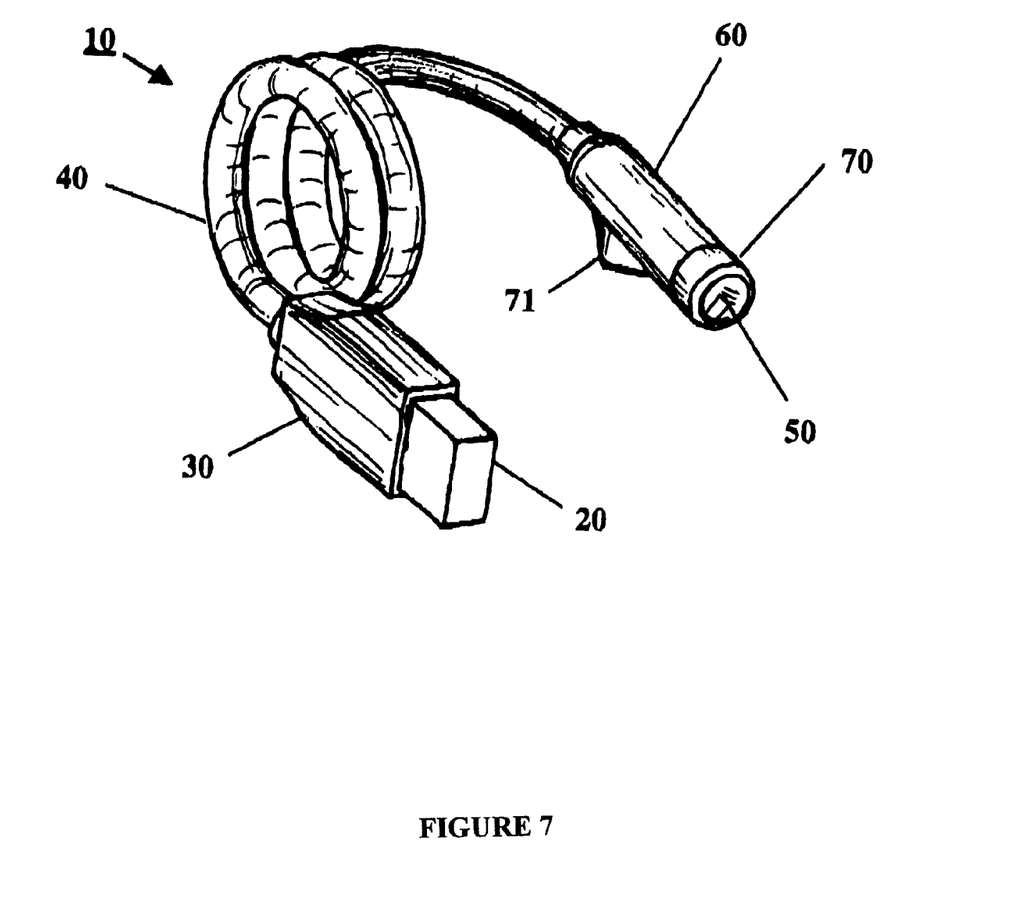
FIG. 7 illustrates the computer light equipped with an ON-OFF switch.

FIG. 7 illustrates the computer light 10 equipped with an ON-OFF switch 71. When the switch 71 is in an ON position, a closed circuit is formed and power from the computer's power supply is allowed to be supplied to the LED 50. When the switch 71 is in an OFF position, an open circuit is formed and power from the computer's power supply is cut off from the LED 50. The computer light 10 may be provided with a female USB connection port (not shown) to allow a different USB slave device to be connected to the USB connector port of the host computer thereby and be operable when the switch 71 of the computer light 10 is turned off.

Figure 8:
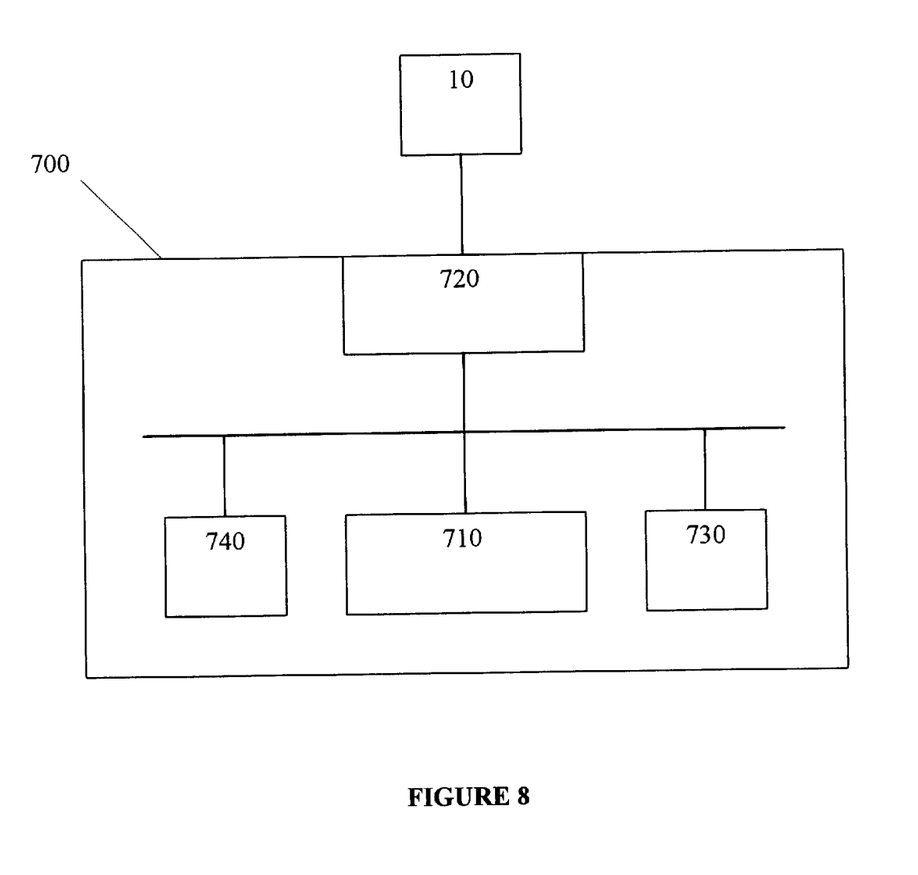
FIG. 8 is a schematic diagram illustrating the components that control the computer light to visually signal an event to the computer user.

FIG. 8 is a schematic diagram of a main console 700 of a computer, illustrating the components that control the computer light 10 to visually signal an event to the computer user. The components include a programmed microprocessor 710 and associated memory 730 for sensing or detecting an event, e.g., an incoming email, an internet telephone call, an incoming fax that is electronically delivered to the computer, or a level of network traffic, and a USB controller circuit 720, under the control of the programmed microprocessor 710, for alternatively supplying power from the power source 740 to the connected computer light 10 and cutting off power from the power source 740 to the connected computer light 10, to cause the computer light 10 to flicker ON and OFF for a preprogrammed period of time, e.g., 5 seconds, which should be long enough to grab the user's attention. The time period for flicker may be controlled by the user by reconfiguring the email program.

Figure 9:
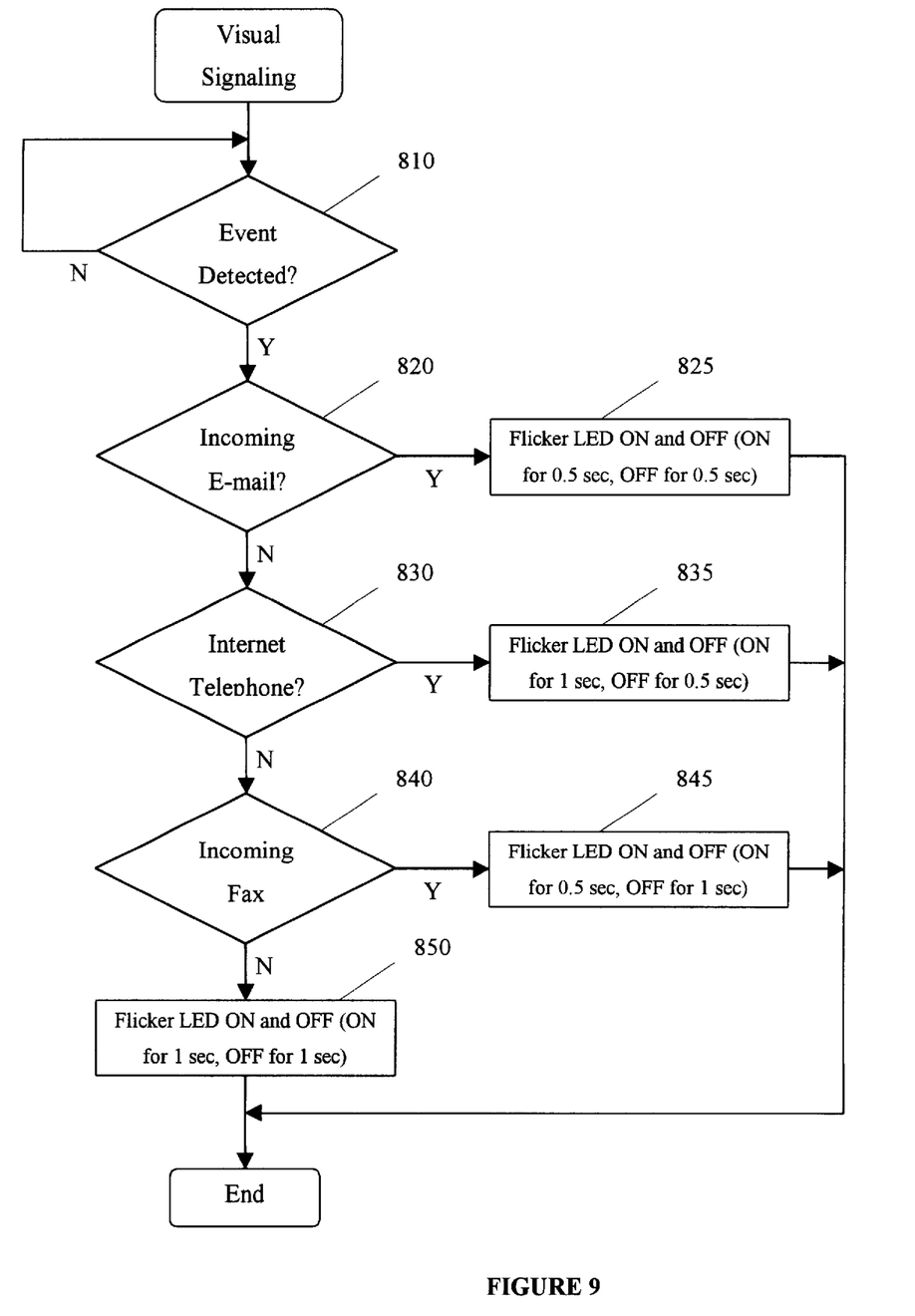
FIG. 9 is a flow diagram illustrating the program steps executed by a processor to visually signal an event to the computer user.

The computer program for executing the visual signaling is illustrated as a flow diagram in FIG. 9. Step 810 is continuously executed by the programmed microprocessor 710 to see if an event, which may be an incoming e-mail, incoming telephone call via internet telephony, an incoming fax message, or any event that the computer recognizes, is sensed or detected. If it is, in Steps 820, 830 and 840, a type of event is distinguished. If the event is an incoming e-mail, the USB controller circuit 720 is controlled to cycle the LED 50 ON and OFF for equal time periods, e.g., ON for 0.5 second and OFF for 0.5 second (Step 825). If the event is an internet telephone call, the USB controller circuit 720 is controlled to cycle the LED 50 ON and OFF with a longer ON period than OFF period, e.g., ON for 1 second and OFF for 0.5 second (Step 835). If the event is an incoming facsimile, the USB controller circuit 720 is controlled to cycle the LED 50 ON and OFF with a shorter ON period than OFF period, e.g., ON for 0.5 second and OFF for 1 second (Step 845). For all other events, the USB controller circuit 720 is controlled to cycle the LED 50 ON for 1 second and OFF for 1 second (Step 850).

In addition, the different information can be conveyed through the use of color through the use of a multicolor LED.

While particular embodiments according to the invention have been illustrated and described above, it will be clear that the invention can take a variety of forms and embodiments within the scope of the appended claims.

What is claimed is:

1. A computer light device comprising:

an LED;

a flexible cable connected at a first end to the LED; and a plug, compatible with a computer port, connected to a second end of the flexible cable, wherein the flexible cable includes an outer tubing, an inner tubing disposed within a tubular passage of said outer tubing, and a conductive wire electrically coupling the plug and the LED, disposed within a tubular passage of said inner tubing, and wherein the outer tubing comprises a first spiral defining the tubular passage of said outer tubing and the inner tubing comprises a second spiral defining the tubular passage of said inner tubing.

2. The computer light device according to claim 1, wherein an inner diameter of the first spiral is substantially equal to an outer diameter of the second spiral.

3. The computer light device according to claim 2, wherein winding directions of the first and second spirals are the same.

4. The computer light device according to claim 1, further comprising a cylindrical housing for the LED and a lens, wherein a first axial end of the cylindrical housing is fitted over the flexible cable and the lens is fitted onto a second axial end of the cylindrical housing.

5. The computer light device according to claim 4, wherein the lens comprises a front plane that is substantially perpendicular to a center axis of the cylindrical housing and a rear plane that is substantially parallel to the front plane, such that light to be emitted by the LED strikes the rear plane before the front plane.

6. A computer light device comprising:

an LED;

a plug compatible with a computer port;

a flexible cable connected at a first end to the LED and at a second end to the plug;

a cylindrical housing for the LED; and a lens, wherein the flexible cable, along an uncoiled portion thereof, includes inner and outer tubings in intimate contact with each other and each of said inner and outer tubings comprises a plurality of windings, and a first axial end of the cylindrical housing is fitted over the flexible cable and the lens is fitted onto a second axial end of the cylindrical housing.

7. The computer light device according to claim 6, wherein the windings of the inner and outer tubings are in the same direction.

8. The computer light device according to claim 6, wherein the flexible cable further includes a pair of insulated copper wires, electrically coupling the plug and the LED, disposed within a tubular passage of said inner tubing.

9. The computer light device according to claim 6, wherein the lens comprises a front plane that is substantially perpendicular to a center axis of the cylindrical housing and a rear plane that is substantially parallel to the front plane, such that light to be emitted by the LED strikes the rear plane before the front plane.

10. The computer light device according to claim 9, wherein the LED is positioned within the cylindrical housing such that a position of the LED's light point source is closer to the flexible cable than the rear plane of the lens.

* * * * *